United States Patent [19]
Tanigawa et al.

[11] Patent Number: 5,995,319
[45] Date of Patent: Nov. 30, 1999

[54] ELECTRONIC APPARATUS HAVING A MAIN BODY AND A DETACHABLE INPUT /OR OUTPUT BLOCK

[75] Inventors: Takashi Tanigawa, Tokyo; Hideaki Kurosawa, Saitama; Ichiro Fujii, Chiba, all of Japan

[73] Assignee: Sony Corporation, Tokyo, Japan

[21] Appl. No.: 09/023,102

[22] Filed: Feb. 13, 1998

[30] Foreign Application Priority Data

Feb. 24, 1997 [JP] Japan ................................ P09-039500

[51] Int. Cl.⁶ .................................................... G11B 5/008
[52] U.S. Cl. ................................. 360/90; 439/347; 360/85
[58] Field of Search .............................. 439/347; 360/90, 360/93, 83–85, 137

[56] References Cited

U.S. PATENT DOCUMENTS

| | | | |
|---|---|---|---|
| 5,192,222 | 3/1993 | Krause | 439/347 |
| 5,208,116 | 5/1993 | Joh | 429/96 |
| 5,407,362 | 4/1995 | Carstens | 439/347 |
| 5,409,394 | 4/1995 | Astier | 439/347 |
| 5,588,862 | 12/1996 | Perkins | 439/347 |
| 5,791,926 | 8/1998 | Zeiss | 439/347 |

*Primary Examiner*—A. J. Heinz
*Attorney, Agent, or Firm*—Jay H. Maioli

[57] ABSTRACT

An electronic apparatus such as a tape recorder includes a main body, an input and/or output block, and an attach/detach mechanism. The main body has a first terminal section. The input and/or output block has a second terminal section to be connected to the first terminal section and is detachably mounted on the main body. When the first terminal section is connected to the second terminal section, the input and/or output block is supplied with a signal from the main body through the first and the second terminal sections. The attach/detach mechanism detachably attaches the input and/or output block on the main body. The attach/detach mechanism has at least one engagement section provided on one of the main body and the input and/or output block, an engagable section provided on the other of the main body and the input and/or output block, so as to be engaged with the engagement section, and an urging mechanism for urging the engagement section to be engaged with the engagable section. The input and/or output block is mounted on the main body, the engagement section is operated to shift against the urging force of the urging mechanism and then shifted by the urging force of the urging mechanism so that the engagable section is engaged with the tip portion of the engagement section so that the input and/or output block is temporarily attached to the main body.

18 Claims, 5 Drawing Sheets

ELECTRONIC APPARATUS HAVING A MAIN BODY AND A DETACHABLE INPUT /OR OUTPUT BLOCK

BACKGROUND OF THE INVENTION

1. Field of the Invention

The present invention relates to an electronic apparatus and an apparatus having a recording function onto a recording medium, and particularly to an electronic apparatus and an apparatus having a recording function to a recording medium which apparatuses have a detachable mechanism.

2. Description of the Prior Art

For example, among recording and/or reproduction apparatuses for recording and/or reproduction of a recording medium such as a tape cassette, there is a small-size recording and/or reproduction apparatus which is convenient for carrying. Such a recording and/or reproduction apparatus may be provided with a loud speaker apparatus besides the recording and/or reproduction mechanism. When recording and/or reproducing a tape cassette in this recording and/or reproduction apparatus, in a recording/reproduction block where a tape cassette is mounted and recording and/or reproduction is carried out, a magnetic head and pinch roller advance into the cassette through a plurality of openings provided in the front side of the cassette so that a magnetic tape is pushed by the pinch roller to a capstan so as to travel and recording/reproduction is carried out by the magnetic head. When reproducing audio data recorded on a magnetic tape, the recording and/or reproduction apparatus outputs from a loud speaker a sound based on the audio data reproduced, or if an earphone is connected to an earphone jack provided in the apparatus, the sound is outputted from the earphone.

In a small-size recording an/or reproduction apparatus, an earphone is normally used for reproducing audio data and no reproduction is carried out through a loud speaker apparatus. When recording a sound in the recording and/or reproduction apparatus, the recording is carried out through a microphone block provided in the apparatus itself without using a loud speaker apparatus. Consequently, in order to further make smaller the recording and/or reproduction apparatus for improving its portability, it can be considered to make detachable this loud speaker apparatus which is not used often.

SUMMARY OF THE INVENTION

It is therefore and object of the present invention to provide an electronic apparatus which resolves the above-mentioned problem.

It is another object of the present invention to provide an apparatus having a function of recording onto a recording medium which apparatus resolves the above-mentioned problem.

According to the present invention, there is provided an electronic apparatus including a main body, an input and/or output block, and an attach/detach mechanism. The input and/or output block is detachably attached to the main body. The attach-detach mechanism detachably attaches the input and/or output block to the main body. The attach/detach mechanism has: at least one engagement section provided on one of the main body and the input and/or output block; an engagable section provided on the other of the main body and the input and/or output block, so as to be engaged with the engagement section; and a urging mechanism for urging the engagement section in a direction for engaging with the engagable section. When the engagement section is engaged with the engagable section, the urging mechanism temporarily attaches the input and/or output block to the main body.

According to the present invention, there is provided an electronic apparatus including a main body, an input and/or output block, and an attach/detach mechanism. The input and/or output block is detachably attached to the main body. The attach/detach mechanism detachably attaches the input and/or output block to the main body. The attach/detach mechanism has: at least one engagement section provided on one of the main body and the input and/or output block; an engagable section provided on the other of the main body and the input and/or output block so as to be engaged with the engagement section; and an urging mechanism for urging the engagement section in a direction for engaging with the engagable section. When attaching the input and/or output block to the main body, the engagement section is operated to shift against the urging force of the urging mechanism and then made to shift by the urging force of the urging mechanism so that the engagable section is engaged with the tip portion of the engagement section, thus temporarily attaching the input and/or output block to the main body.

According to the present invention, there is provided an electronic apparatus including a main body, an input and/or output block, and an attach/detach mechanism. The main body has a first terminal section. The input and/or output block has a second terminal section to be connected to the first terminal section and is detachably attached to the main body. When the first terminal section is connected to the second terminal section, the input and/or output block is supplied with at least a signal from the main body through the first and the second terminal sections. The attach/detach mechanism detachably attaches the input and/or output block to the main body. The attach/detach mechanism has: a plurality of engagement sections provided on one of the main body and the input and/or output block; a plurality of engagable sections on the other of the main body and the input and/or output block so as to be engaged with the respective engagement sections; and an urging mechanism for urging the plurality of engagement sections to be engaged respectively with the plurality of engagable sections. When the plurality of engagement sections are engaged with the plurality of engagable sections, the urging mechanism temporarily attaches the input and/or output block to the main body.

According to the present invention, there is provided an electronic apparatus including a main body, an input and/or output block, and an attach/detach mechanism. The main body has a first terminal section. The input and/or output block has a second terminal section to be connected to the first terminal section and is detachably attached to the main body. When the first terminal section is connected to the second terminal section, the input and/or output block is supplied with at least a signal from the main body through the first and the second terminal sections. The attach/detach mechanism detachably attaches the input and/or output block to the main body. The attach/detach mechanism has: a plurality of engagement sections provided on one of the main body and the input and/or output block; a plurality of engagable sections provided on the other of the main body and the input and/or output block so as to be engaged with the respective engagement sections; and an urging mechanism for urging the plurality of engagement sections to be engaged with the plurality of engagable sections. When attaching the input and/or output block to the main body, the engagement sections are operated to shift against the urging force of the urging mechanism and then made to shift by the urging force of the urging mechanism so that the plurality of engagable sections are engaged with the tip portions of the engagement sections, thus temporarily attaching the input and/or output block to the main body.

According to the present invention, there is provided an apparatus having a function of recording on a recording medium, the apparatus including a recording block, an operation block, and an open/close mechanism. The recording block records a signal inputted to a recording medium mounted on the apparatus body. The operation block has an operation pushbutton for entering a recording start operation to the recording block. The operation block is provided on an external surface of the apparatus body. The open/close mechanism opens and closes the upper surface of the operation block. The open/close mechanism is provided on the apparatus body in such a manner that the mechanism can move between a position of closing the upper surface of the operation pushbutton and a position of opening the upper surface of the operation pushbutton.

DETAILED DESCRIPTION OF THE PREFERRED EMBODIMENTS

Description will now be directed to an electronic apparatus according to the present invention with reference to the attached drawings. In an embodiment described below, the electronic apparatus is a recording and/or reproduction apparatus using a tape cassette containing a magnetic tape as a recording medium.

Figure 1:
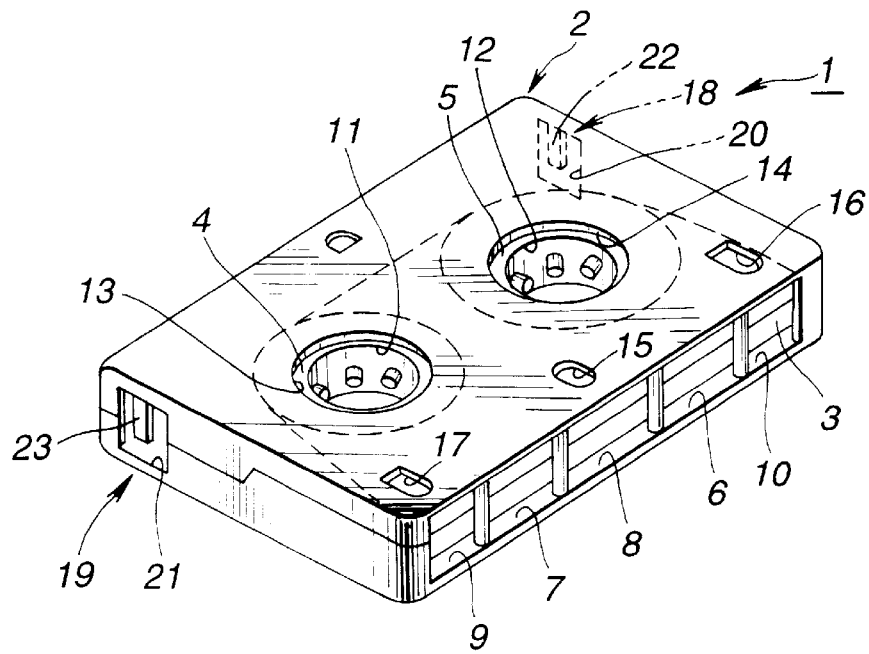
FIG. 1 is a perspective view showing a tape cassette used in a recording and/or reproduction apparatus according to the present invention.

This recording and/or reproduction apparatus uses a tape cassette 1 having a size approximately ¼ of a so-called compact cassette. As shown in FIG. 1, the tape cassette 1 includes a cassette body 2 made from a synthetic resin material having a parallelepiped main surface and containing a magnetic tape 3 rolled on a pair of tape reels 4 and 5 which are rotatably provided. The cassette body 2 has a front side where the magnetic tape 3 is extending between the tape reels 4 and 5. More specifically, the front side has recording/reproduction openings 6 and 7 into which a magnetic head as a recording and/or reproduction mechanism advances and a pinch roller opening 8 into which a pinch roller advances, so that the magnetic tape 3 extends outwardly. The recording/reproduction openings 6 and 7 are sandwiched between stopper member openings 9 and 10 into which stopper members of the recording and/or reproduction apparatus advance.

On the main surface of the cassette body 2, there are provided reel shaft insert holes 13 and 14 for orienting outwardly the reel shaft holes 11 and 12 to which tape reel drive mechanisms provided on the tape reels 4 and 5 are engaged. The cassette body 2 is also provided on the front center with a capstan shaft hole 15 into which a capstan shaft advances. This capstan shaft hole 15 is sandwiched by positioning holes 16 and 17 into which positioning pins are engaged.

The cassette body 2 is provided with erroneous recording prevention mechanisms 18 and 19 on its two sides near the back side. The erroneous recording prevention mechanisms 18 and 19 consist of hole sections 20 and 21 provided on the cassette body 2 and cutting off pieces 22 and 23 provided so as to cover the hole sections 20 and 21. In the erroneous recording prevention mechanisms 18 and 19 with the cutting off pieces 22 and 23 covering the hole sections 20 and 21 provided on the cassette body 2, it is detected by a detection mechanism of the recording and/or reproduction apparatus that the tape cassette 1 is in a state capable of recording to the magnetic tape 3. In the erroneous recording prevention mechanisms 18 and 19 with the cutting off pieces 22 and 23 cut off from the hole sections 20 and 21, it is detected by the detection mechanism of the recording and/or reproduction apparatus that the tape cassette 1 is in a state incapable of recording.

Figure 2:
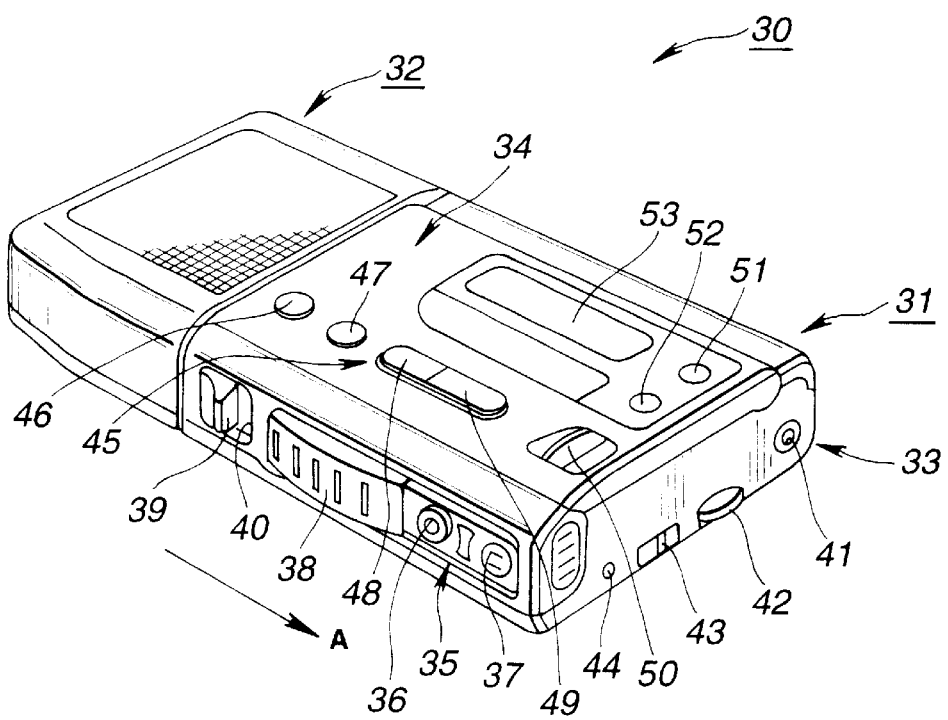
FIG. 2 is a perspective view showing a configuration of the recording and/or reproduction apparatus according to an embodiment of the present invention.

As shown in FIG. 2, the recording and/or reproduction apparatus 30 having the aforementioned configuration consists of a recording/reproduction unit 31 constituting of a recording/reproduction block of the tape cassette 1 and a loud speaker unit 32 which is detachably attached to this recording/reproduction unit 31.

The recording/reproduction unit 31 includes a body 33 having a recording/reproduction block where the tape cassette 1 is contained with its back side not having the plurality of openings 6, 7, 8, 9, and 10 as an insert end for recording and/or reproduction of the magnetic tape 3 contained in this tape cassette 1, and a cover 34 for closing and opening the recording/reproduction block.

The recording/reproduction unit 31 has an external frame made from a metal material such as aluminium and having a parallelepiped shape slightly larger than the external dimensions of the tape cassette. The body 33 is provided with an operation block 35 on its front side. This operation block 35 has a plurality of pushbuttons. The plurality of operation buttons include a recording pushbutton 36 used for recording an audio signal on the magnetic tape 3 of the tape cassette 1 and a halt pushbutton 37 used for temporarily terminating the recording or the reproduction operation. When one of the pushbuttons of the operation block 35 is operated, the pushbutton presses a diaphragm switch provided on a flexible substrate arranged in the body 33. As a result, the recording/reproduction block is set to a corresponding operation state. For example, if the recording button 36 is depressed with a microphone connected to an earphone/microphone jack which will be detailed later, the recording/reproduction unit 31 is switched to a recording state so that an output signal from the microphone is supplied to a recording circuit of the recording/reproduction unit 31 and the magnetic head of the unit 31 records on the magnetic tape audio data based on the signal from the recording circuit.

The body 33 is provided with an erroneous operation prevention shutter 38 on the body side surface having the operation block 35, so as to cover and open the operation block 35. This erroneous operation prevention shutter 38 is moved between a first position to cover the pushbuttons of the operation block 35 and a second position to open the operation block 35. A user touches this erroneous operation prevention shutter 38 with his/her finger so as to slide it to the second position for opening the operation block 35 only when operating the pushbuttons for recording or halting the recording. Other than this, the user slides the shutter 38 in the direction indicated by the arrow A in FIG. 2 to close the operation block 35, thus preventing erroneous operation of the operation block 35.

The body 33 is provided with a lock release knob 39 in the vicinity of the operation block 35 for releasing the locked state of the cover 34 for rotating the cover 34 to open the recording/reproduction block. This lock release knob 39 slides along a guide hole 40 provided on the front side of the body 33. The lock release knob 39 is urged by a spring (not depicted) toward a direction opposite to the arrow A in FIG. 2 so as to be positioned at the left end of the guide hole 40. In this state, a lock claw (not depicted) provided on the body 33 is engaged in an engaging section of the cover 34, i.e., the cover 34 is in a locked state. When the lock release knob 39 is moved by the user to slide in the direction of the arrow A in FIG. 2 against the elastic force of the spring, the lock claw of the body 33 is released from the engaging section of the cover 34 and the cover 34 opens the recording/reproduction block. The cover 34 is always urged by an urging mechanism (not depicted) in the direction to open the recording/reproduction block.

One of the sides of the body 33 is provided with an earphone/microphone jack 41. For example, when the loud speaker unit 32 is removed from the recording/reproduction unit 31, the user can insert an earphone into this earphone/microphone jack 41 so that he/she can hear the sound based on the audio data reproduced. This side of the body 33 is also provided with a sound volume knob 42, a tape speed switching knob 43, and an identification section 44 which is lit when the recording state is set in.

On the other hand, the cover 34 is provided with an operation section 45 on its upper surface. This operation section 45 includes: a rewind button 46 for rewinding the magnetic tape 3 of the tape cassette 1 mounted on the recording/reproduction block; a rapid feed button 47 for rapidly feeding the magnetic tape 3 of the tape cassette 1; a stop button 48 for terminating the operation such as reproduction and recording; a reproduction button 49 for starting a reproduction operation; a hold knob 50 for holding the operation of the apparatus; a counter button 51 used to reset a count value indicating the progress of the magnetic tape 3 displayed on a display panel 53 which will be detailed later; and a second recording button 52 for starting a recording operation only when a sound louder than a predetermined level is detected by the microphone. In the same way as the aforementioned operation block 35, when one of the operation buttons of the operation block 45 is depressed, the button pushes a diaphragm switch provided on a flexible substrate arranged in the body 33 so that the recording/reproduction block is switched to an operation state corresponding to the depressed operation button.

The cover 34 is provided with a liquid crystal display panel 53. This liquid crystal display panel 53 displays a mark indicating the current apparatus state such as reproduction state and recording state, a mark indicating a remaining amount of the battery as a power source, and a tape count value indicating the travel amount of the magnetic tape 3.

Figure 3:
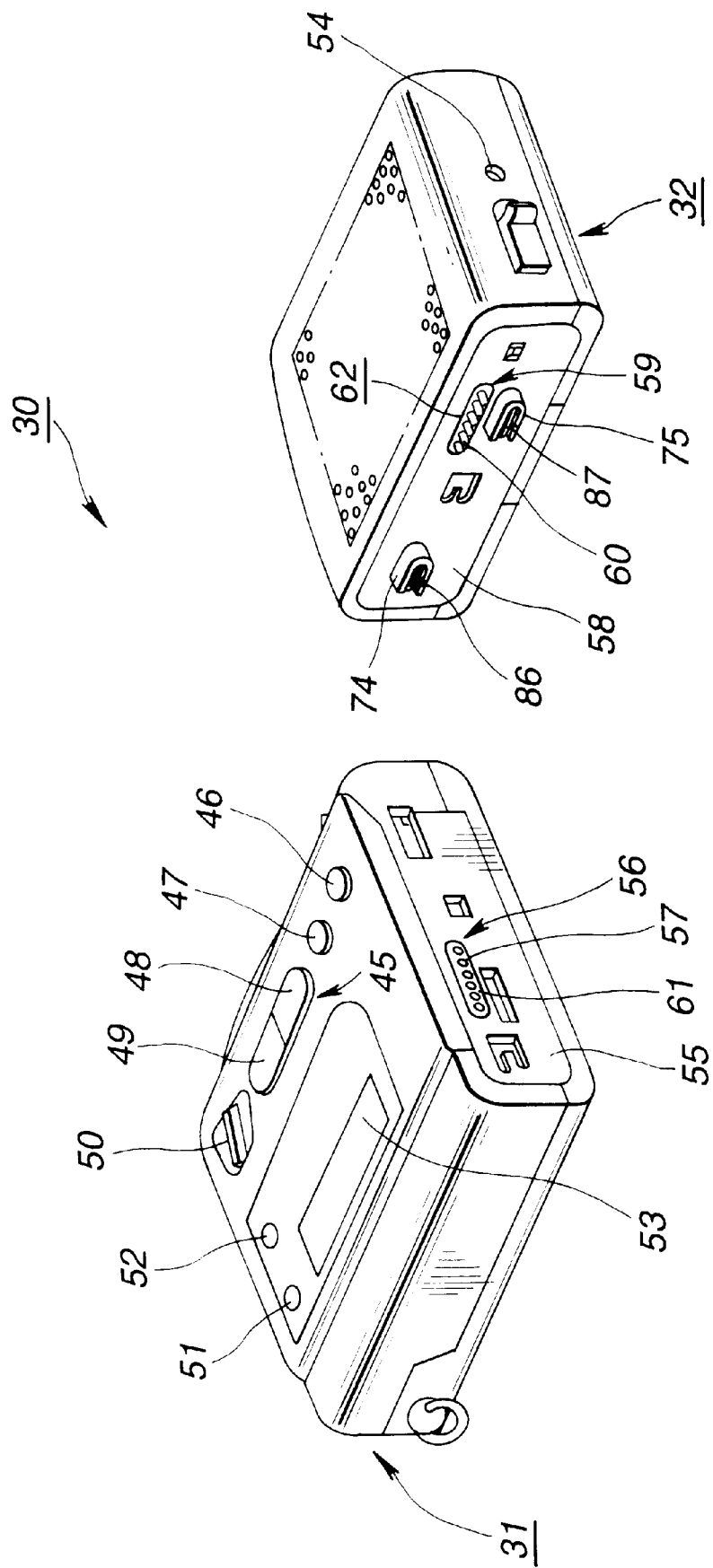
FIG. 3 is a perspective view showing a loud speaker unit removed from the recording and/or reproduction apparatus according to the embodiment of the present invention.

The loud speaker 32 is detachably attached to a side of the recording/reproduction unit 31 not having the earphone/microphone jack 41, the sound volume knob 42, the tape speed switching knob 43, and the identification section 44, i.e., to a side opposite the side having the earphone/microphone jack 41 and the others. This loud speaker unit 32 contains a loud speaker apparatus. The loud speaker unit 32, when attached to the recording/reproduction unit 31, outputs a sound reproduced from audio data recorded in the magnetic tape 3 of the tape cassette 1 mounted on the recording/reproduction block. As shown in FIG. 3, this loud speaker unit 32 is provided with a DC IN jack 54 on its side, serving as an external power source terminal for supplying external power to the apparatus. This DC IN jack 54 is to be connected to an output terminal of an external power source so as to be supplied with DC power which is supplied from a power adapter for converting a domestic AC power into a predetermined DC power.

Figure 4:
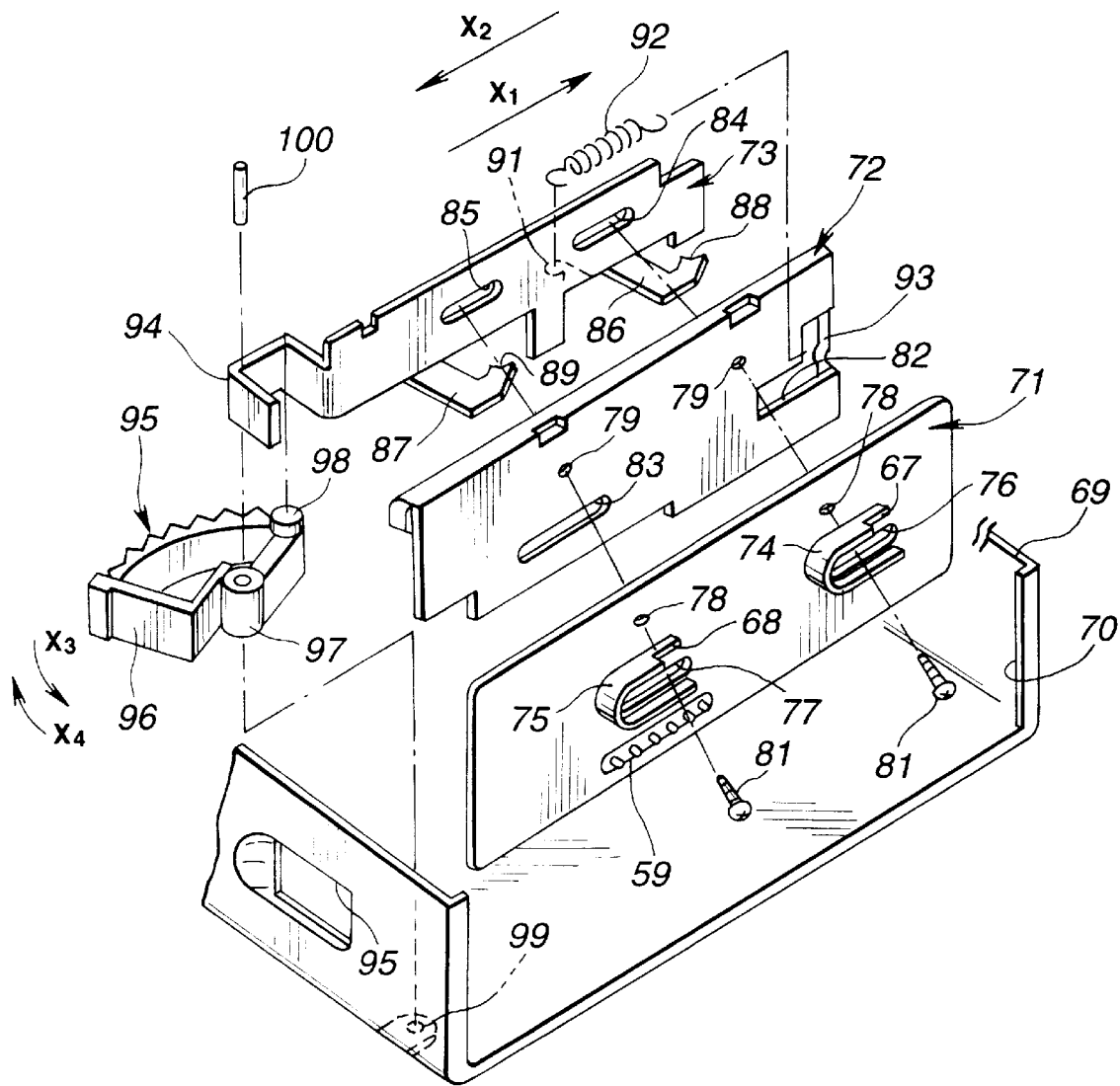
FIG. 4 is an exploded perspective view showing a detachable mechanism of the loud speaker unit.

As shown in FIG. 3 and FIG. 4, a jack block 56 is provided on the attachment surface 55 of the recording/reproduction unit 31 where the loud speaker unit 32 is attached. This jack block 56 has six terminals 57 arranged at a very small interval. The terminals 57 consist of three power terminals and three signal terminals. A connector block 59 to be connected to this jack block 56 is provided on the attachment surface 58 of the loud speaker unit 32 where the recording/reproduction unit 31 is attached. This connector block 59 has six connection terminals 60 arranged at a very small interval corresponding to the terminals 57. That is, the connection terminals 60 consist of three power terminals for supplying power to the three terminals 57 and three signal terminals which are supplied with output signals through the remaining three of the terminals 57 from the recording/reproduction block. The output signals supplied from the recording/reproduction block to the three terminals 60, i.e., signals obtained by reproducing the magnetic tape, are supplied to the loud speaker of the loud speaker unit 32 so that a sound reproduced from the magnetic tape is outputted. The connection terminal sections 57 and 60 have contacts made from a conductive metal material. The connection pins of the connector block 59 protrude from the attachment surface 58 when the loud speaker unit 32 is not attached to the recording/reproduction unit 31. When the unit 32 is attached to the unit 31, i.e., when the connector block 59 is connected to the jack block 56, the connection pins are pushed by the jack block 56 so as to retrieve from the attachment surface 58. As a result, the terminal sections 57 and 60 are elastically and electrically connected to each other. The area of the jack block 56 other than the terminal section 57 and the area of the connector block 59 other than the connection terminal section 60 are provided with insulation areas 61 and 62 made from an elastic material such as rubber.

Each of the recording/reproduction unit 31 and the loud speaker unit 32 are provided with a power source block (not depicted). The power source block of the recording/reproduction unit 31 contains one Tan-4 battery cell, and the power source block of the loud speaker unit 32 contains two Tan-4 battery cells. The recording and/or reproduction apparatus 30 can also be supplied with power from the aforementioned DC IN jack provided on the loud speaker unit 32. This recording and/or reproduction apparatus 30 has three power blocks: the power block of the recording/reproduction unit 31, the power block of the loud speaker unit 32, and the power block of the DC IN jack 54. The recording/reproduction unit 31 and the loud speaker unit 32 are electrically connected when the loud speaker unit 32 is attached to the recording/reproduction unit 31 so that the jack block 56 is connected to the connector block 59. If the recording/reproduction unit 31 alone has a battery, the respective components of the recording and/or reproduction apparatus 30 are supplied with power from this battery. When both of the recording/reproduction unit 31 and the loud speaker unit 32 contain batteries, power is supplied from these two units to the respective components of the apparatus 30. If the DC IN jack 54 is connected when one of the units 31 and 32 contains a battery, the power from the DC IN jack 54 is supplied with the first priority to the respective components of the apparatus 30.

When the recording and/or reproduction apparatus 30 is used with the recording/reproduction unit 31 alone whose size is only slightly larger than the size of the tape cassette 1 used in the recording/reproduction unit 31, it can be said that the apparatus 30 is very convenient for carrying. When reproducing audio data recorded on the magnetic tape 3 of the tape cassette 1, it is possible to attach the loud speaker unit 32 to the recording/reproduction unit 31, thus enhancing the function of the apparatus 30. In the recording and/or reproduction apparatus 30, if power is supplied through the DC IN jack 54, this power is used with the first priority even when the recording/reproduction unit 31 and the loud speaker unit 32 are charged with battery cells, thus preventing consumption of the battery cells.

As shown in FIG. 3, in the recording and/or reproduction apparatus 30, the loud speaker unit 32 can be detached from and attached to the recording/reproduction unit 31.

As shown in FIG. 4, the loud speaker unit 32 has an attachment mechanism including a base member 71 constituting the attachment surface 58, a fixed member 72 which is fixed to this base member 71, and a slider 73 which is slidably attached to this fixed member 72.

Figure 5:
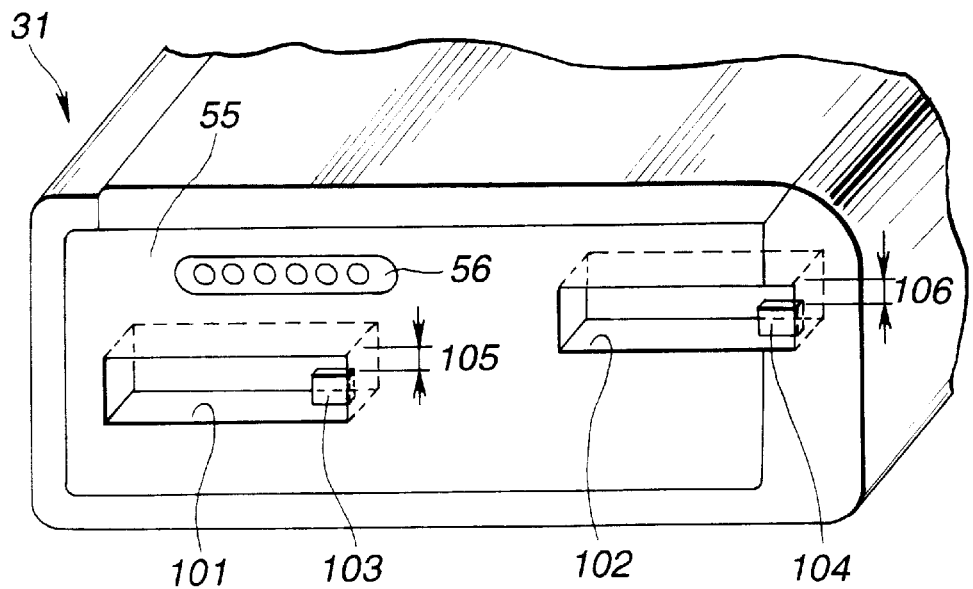
FIG. 5 is a plan view showing a configuration of the recording/reproduction unit attachment surface.

The base member 71 is engaged in an indentation 70 provided on an external frame 69 of the loud speaker unit 32 and is provided with the connector block 59 and a pair of guide walls 74 and 75 formed to protrude to be respectively engaged with indentations 101 and 102 provided on the attachment surface 55 of the recording/reproduction unit as shown in FIG. 5. Each of the guide walls 74 and 75 are formed in a U-shape. Surrounded by these U-shaped guide walls 74 and 75, there are formed guide holes 76 and 77 to guide sliding of lock pieces of the slider 73. The lock pieces of the slider 73 protrude outward through the guide holes 76 and 77. Each of the guide walls 74 and 75 are provided with a cut-off portion 67, 68. These cut-off portions 67 and 68 serve as a space for pressing pieces 103 and 104 provided in a first indentation 101 and a second indentation 102 of the recording/reproduction unit 31 which will be detailed later.

The fixed member 72 is attached to the rear surface of the base member 71 having the aforementioned configuration. More specifically, the fixed member 72 is fixed to the base member 71 with a screw 81 thrusting through a screw hole 78 formed in the base member 71 and a screw hole 79 formed in the fixed member 72. This screw 81 has its tip protruding outward from the base member 71. The fixed member 72 has guide holes 82 and 83 for guiding sliding areas of the slider 73.

Thus, the slider 73 is slidably attached to this fixed member 72. More specifically, the slider 73 has one end inserted into the guide hole 82 and is slidably supported by the fixed member 72. The slider 73 has on its main surface guide holes 84 and 85. The tips of the aforementioned screws 81 are engaged in these guide holes 84 and 85, so as to define the sliding areas of the slider 73. The slider 73 also has a pair of lock pieces 86 and 87 which are formed to be vertical to the main surface of the slider 73. The lock pieces 86 and 87 are formed in claw shapes whose tips are provided with stopper portions 88 and 89. The lock pieces 86 and 87 have an outward surface slanted. The lock pieces 86 and 87 are introduced through the guide holes 82 and 83 of the fixed member 72 and the guide holes 76 and 77 of the base member 71, protruding outward so that the end surface of the lock pieces 86 and 87 is positioned in the plane defined by the end surface of the guide walls 74 and 75 provided on the base member 71.

The slider 73 has a stopper piece 91 on its main surface of the side not having the lock pieces 86 and 87. A coil spring 92 has one end fixed to this stopper piece 91 and the other end of the coil spring 92 is fixed to a stopper section 93 provided in the vicinity of the guide hole 82 of the fixed member 72. That is, the coil spring 92 urges the slider 73 in the direction of the arrow $X_1$ in FIG. 4.

The slider 73 has the other end which is formed approximately into an angled U shape serving as an engagement section 94. With this engagement section 94 is engaged an operation member 95 which makes the slider 73 slide. This operation member 95 has: an operation section 96 facing outward through a hole provided in the external frame 69; a shaft section 97 which rotatably supports the operation member 95; and a support section 98 of a boss to be engaged with the engagement section 94 of the slider 73. In this operation member 95, the shaft section 97 is positioned on a bearing section 99 provided on the bottom surface of the external frame 69, and a shaft 100 is inserted into a shaft hole provided in the shaft section 97 for supporting the operation member 95. The operation member 95 thus supported is rotated in the direction of the arrow $X_3$ or $X_4$ in FIG. 4. When the operation member 95 is rotated in the direction of the arrow $X_3$, the slider 73 slides in the direction of the arrow $X_2$ against the elastic force of the coil spring 92. When the operation member 95 is rotated in the direction of the arrow $X_4$, the slider 73 slides in the direction of the arrow $X_1$ together with the elastic force of the coil spring 92.

As shown in FIG. 5, the attachment surface 55 of the recording/reproduction unit 31 has the first indentation 101 where the guide wall 75 and the lock piece 87 are inserted and the second indentation 102 where the guide wall 74 and the lock piece 86 are inserted. The first indentation 101 and the second indentation 102 are formed to have almost identical size as the guide walls 74 and 75 so that the guide walls 74 and 75 can be inserted. The first and the second indentations 101 and 102 are respectively provided with pushing pieces 103 and 104, each formed in the middle of the depth at the bottom corner. When the guide walls 74 and 75 and the lock pieces 86 and 87 are inserted into the first and the second indentations 101 and 102, the pushing pieces 103 and 104 push the tips of the lock pieces 86 and 87. Above the pushing pieces 103 and 104, there are provided spaces 105 and 106. The spaces 105 and 106 serve as recesses for the side of the guide walls 75 and 74 not having the cut-off portions 67 and 68.

The guide wall 74 and the guide wall 75 of the loud speaker unit 32 are formed at a stepped position as shown in FIG. 3. Corresponding to this, the first indentation 101 and the second indentation 102 of the recording/reproduction unit 31 are provided so as to have a step as shown in FIG. 5. This facilitates the user to correctly attach the loud speaker unit 32 to the recording/reproduction unit 31.

With the attachment mechanism of the loud speaker unit 32 having the aforementioned configuration, the loud speaker unit 32 is attached to the recording/reproduction unit 31 as follows. Firstly, the loud speaker unit 32 detached from the recording/reproduction unit 31 is in the state shown in FIG. 6. The slider 73 has slid in the direction of the arrow $X_1$ in FIG. 6 because of the elastic force of the coil spring 92. Consequently, the operation member 95 is rotated in the direction of the arrow $X_4$ because the slider 73 has slid in the direction of the arrow $X_1$. In this state, the operation section 96 is almost in the same plane as the surface of the external frame 69.

Figure 6:
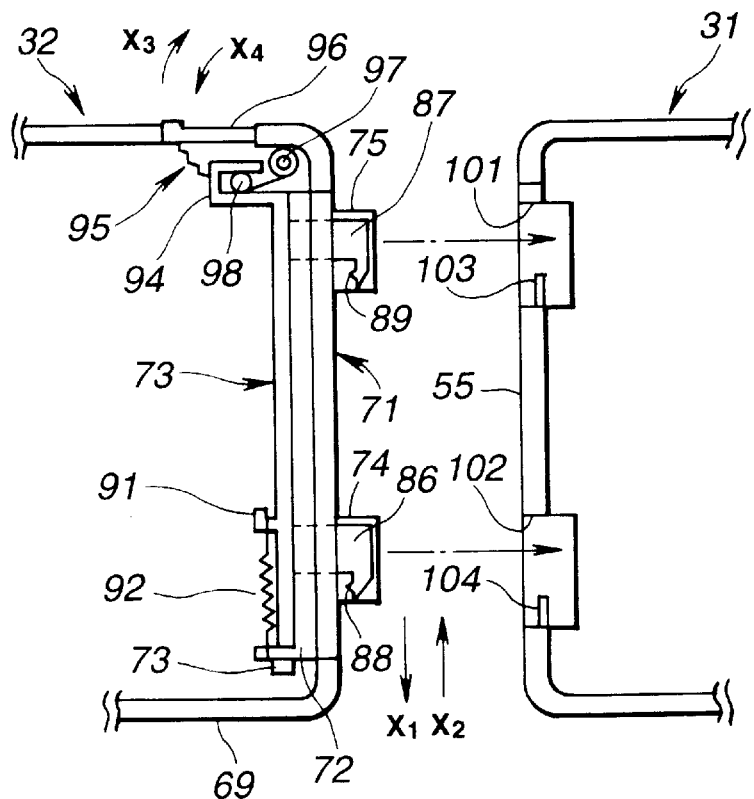
FIG. 6 is a plan view showing a state of the loud speaker unit prior to being attached to the recording/reproduction unit.
Figure 7:
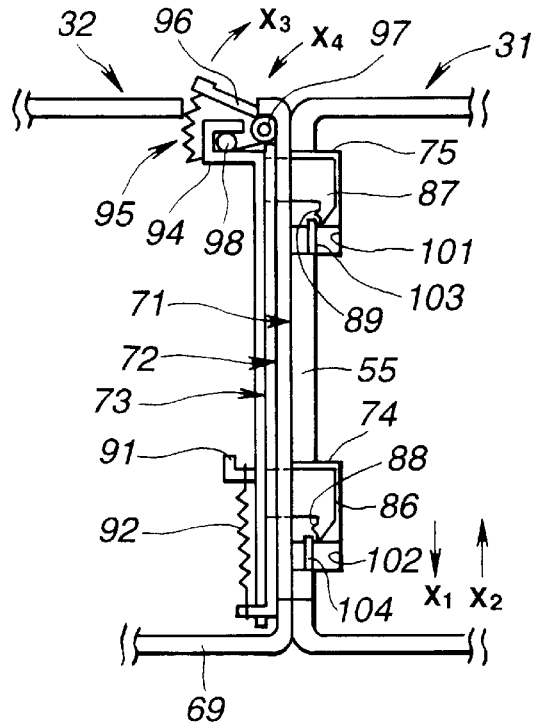
FIG. 7 is a plan view showing a state of the loud speaker unit half attached to the recording/reproduction unit.

When the loud speaker unit 32 is attached to the recording/reproduction unit 31 in the direction indicated by dotted lines in FIG. 6, the apparatus 30 is in a state shown in FIG. 7. When the guide walls 74 and 75 are inserted into the first and the second indentations 101 and 102, the lock pieces 86 and 87 are brought into abutment with the pressing pieces 103 and 104. As the lock pieces 86 and 87 are formed with external surfaces slanted, they are pressed by the pressing pieces 103 and 104 so as to slide in the direction of the arrow $X_2$ against the elastic force of the coil spring 92. After this, the lock pieces 86 and 87, passing over the pressing pieces 103 and 104, advance into the first and the second indentations 101 and 102 when the lock pieces 86 and 87 are made to slide in the direction of the arrow $X_1$ by the elastic force of the coil spring 92. The stopper portions 88 and 89 provided at the end of the lock pieces 86 and 87 are stopped by the pressing pieces 103 and 104, so as to prevent sliding in the direction of the arrow $X_1$. When the lock pieces 86 and 87 are pressed by the pressing pieces 103 and 104, the operation member 95 is rotated in the direction of the arrow $X_3$ and the stopper portions 88 and 89 engaged with the lock pieces 86 and 87 are slightly rotated in the direction of the arrow $X_4$. Consequently, as shown in FIG. 7, the operation section 96 of the operation member 95 is set to protrude a little from the surface of the external frame 69. That is, in this state, the loud speaker unit 32 is temporarily mounted on the recording/reproduction unit 31.

Figure 8:
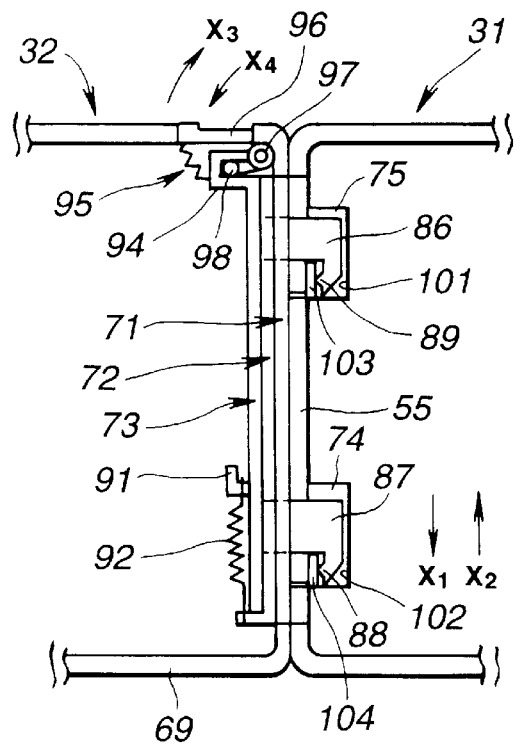
FIG. 8 is a plan view showing a state of the loud speaker unit completely attached to the recording/reproduction unit.

When the user presses the operation section 96 with his/her finger or the like so as to rotate the operation member 95 in the direction of the arrow $X_4$, the slider 73, i.e., the lock pieces 86 and 87 are made to slide in the direction of the arrow $X_1$, and the lock pieces 86 and 87 are completely engaged with the pressing pieces 103 and 104, thus completely mounting the loud speaker unit 32 on the recording/reproduction unit 31 as shown in FIG. 8.

Thus, it is possible to easily attach and detach the loud speaker unit 32, and the recording and/or reproduction apparatus can enhance the portable feature and the operation feature. In the recording and/or reproduction apparatus, the loud speaker unit 32 can be mounted on the recording/reproduction unit 31 without sliding with respect to the recording/reproduction unit 31. This prevents a shortcircuit between terminals of the jack block 56 and the connector block 59.

The explanation above has been made on the recording and/or reproduction apparatus for a tape cassette having a ¼ of the size of the ordinary tape cassette. The present invention is not limited to this but can be applied to a recording and/or reproduction apparatus for a tape cassette of the ordinary size and a recording and/or reproduction apparatus for a disc cartridge using a disc-shaped recording medium as a recording medium.

In the recording and/or reproduction apparatus according to the aforementioned embodiment, the slider is provided with a pair of lock pieces, but it is also possible that the slider is provided with at least one lock piece. The present invention is not limited to the aforementioned embodiment but can be modified in various ways in the scope of the present invention.

What is claimed is:

1. An electronic apparatus comprising:

a main body;

an input and/or output block detachably mounted on said main body; and an attaching/detaching mechanism for detachably mounting said input and/or output block on said main body, wherein said attaching/detaching mechanism includes:

at least one engagement section provided in one of said main body and said input and/or output block, said engagement section having a plurality of guide walls each formed in a U-shape and protruding from the engagement section and each having a cut-off portion, an engagable section provided on the other of said main body and said input and/or output block for engaging with said engagement section, said engagable section having a plurality of indentations for respectively receiving the plurality of guide walls inserted thereinto, each indentation being provided with a pushing piece for bringing a tip portion of the engagement section into abutment with the pushing pieces, wherein a recess is located above each pushing piece for receiving a side of each guidewall not having the cut-off portion, and a spring for urging a slide member of said engagement section to urge said engagement section to engage with said engagable section, wherein the engagement section also includes an operation mechanism for shifting the slide member with or against an urging force of the spring when the operation member is rotated clockwise or counter-clockwise, respectively, wherein said spring brings said input and/or output block into a temporarily mounted state on said main body when said engagement section is engaged with said engagable section.

2. The electronic apparatus as set forth in claim 1, wherein the operation mechanism operates said spring to shift said engagement section in a direction for engaging with said engagable section when said input and/or output block is temporarily mounted on said main body.

3. The electronic apparatus as set forth in claim 2, wherein said spring includes an urging member for urging said slide member in said direction where said engagement section is engaged with said engagable section.

4. The electronic apparatus as set forth in claim 3, wherein said operation mechanism operates said slide member for shifting said engagement section in said direction for engaging with said engagable section.

5. An electronic apparatus comprising:

a main body;

an input and/or output block detachably mounted on said main body; and an attaching/detaching mechanism for detachably mounting said input and/or output block on said main body, wherein said attaching/detaching mechanism includes:

at least one engagement section provided in one of said main body and said input and/or output block, said engagement section having a plurality of guide walls each formed in a U-shape and protruding from the engagement section and each having a cut-off portion, an engagable section provided on the other of said main body and said input and/or output block for engaging with said engagable section, said engagable section having a plurality of indentations for respectively receiving the plurality of guide walls inserted thereinto, each indentation being provided with a pushing piece for bringing a tip portion of the engagement section into abutment with the pushing pieces, wherein a recess is located above each pushing piece for receiving a side of each guidewall not having the cut-off portion, and a spring for urging a slide member of said engagement section to urge said engagement section to engage with said engagable section, wherein the engagement section also includes an operation mechanism for shifting the slide member with or against an urging force of the spring when the operation member is rotated clockwise or counter-clockwise, respectively, wherein said input and/or output block on said main body is mounted by said engagement section shifted against the urging force of said spring and then shifted by the urging force of said spring so that said engagable section is engaged with the tip portion of said engagement section bringing said input and/or output block into a temporarily mounted state on said main body.

6. The electronic apparatus as set forth in claim 5, wherein the operation mechanism operates said spring to shift said engagement section in a direction for engaging with said engagable section when said input and/or output block is temporarily mounted on said main body.

7. The electronic apparatus as set forth in claim 6, wherein said spring includes an urging member for urging said slide member in said direction where said engagement section is engaged with said engagable section.

8. The electronic apparatus as set forth in claim 7, wherein an operation of said operation mechanism while said engagable section is engaged with the tip portion of said engagement section causes said attaching/detaching mechanism to shift said slide member for engaging said engagement section with said engagable section and for mounting said input and/or output block on said main body.

9. An electronic apparatus comprising:

a main body having a first terminal section;

an input and/or output block having a second terminal section for connecting to said first terminal and detachably mounted on said main body for supplying said input and/or output block with a signal at least from said main body through said first terminal section and said second terminal section when said first terminal section is connected to said second terminal section; and an attaching/detaching mechanism for detachably mounting said input and/or output block on said main body, wherein said attaching/detaching mechanism includes:

a plurality of engagement sections provided on one of said main body and said input and/or output block, each engagement section having a plurality of guide walls each formed in a U-shape and protruding from the engagement section and each having a cut-off portion, a plurality of engagable sections provided on the other of said main body and said input and/or output block for engaging with said plurality of engagement sections, each engagable section having a plurality of indentations for respectively receiving the plurality of guide walls inserted thereinto, each indentation being provided with a pushing piece for bringing a tip portion of the engagement section into abutment with the pushing pieces, wherein a recess is located above each pushing piece for receiving a side of each guidewall not having the cut-off portion, and a spring for urging a slide member of said engagement section to urge said plurality of engagement sections in a direction for engaging with said plurality of engagable sections, wherein each engagement section also includes an operation mechanism for shifting the slide member with or against an urging force of the spring when the operation member is rotated clockwise or counter-clockwise, respectively, wherein said spring brings said input and/or output block into a temporarily mounted state on said main body when said plurality of engagement sections are engaged with said plurality of engagable sections.

10. The electronic apparatus as set forth in claim 9, wherein the operation mechanism operates said spring to shift said plurality of engagement sections in said direction for engaging with said plurality of engagable sections when said input and/or output block is temporarily mounted on said main body.

11. The electronic apparatus as set forth in claim 10, wherein said spring includes an urging member for urging said slide member in said direction where said plurality of engagement sections are engaged with said plurality of engagable sections.

12. The electronic apparatus as set forth in claim 11, wherein said operation mechanism operates said slide member for shifting said plurality of engagement sections in said direction for engaging with said plurality of engagable sections.

13. The electronic apparatus as set forth in claim 9, wherein said plurality of engagement sections are provided in a stepped arrangement and said plurality of engagable sections are provided in a corresponding stepped arrangement.

14. An electronic apparatus comprising:

a main body having a first terminal section;

an input and/or output block having a second terminal section for connecting to said first terminal section and detachably mounted on said main body for supplying said input and/or output block with a signal at least from said main body through said first terminal section and said second terminal section when said first terminal section is connected to said second terminal section; and an attaching/detaching mechanism for detachably mounting said input and/or output block on said main body, wherein said attaching/detaching mechanism includes:

a plurality of engagement sections provided on one of said main body and said input and/or output block, each engagement section having a plurality of guide walls each formed in a U-shape and protruding from the engagement section and each having a cut-off portion, a plurality of engagable sections provided on the other of said main body and said input and/or output block for engaging with said plurality of engagement sections, each engagable section having a plurality of indentations for respectively receiving the plurality of guide walls inserted thereinto, each indentation being provided with a pushing piece for bringing a tip portion of the engagement section into abutment with the pushing pieces, wherein a recess is located above each pushing piece for receiving a side of each guidewall not having the cut-off portion, and a spring for urging a slide member of said engagement section to urge said plurality of engagement sections in a direction for engaging with said plurality of engagable sections, wherein each engagement section also includes an operation mechanism for shifting the slide member with or against an urging force of the spring when the operation member is rotated clockwise or counter-clockwise, respectively, wherein said input and/or output block on said main body is mounted by said plurality of engagement sections shifted against the urging force of said spring and then shifted by the urging force of said spring for engaging said plurality of engagable sections with a plurality of tip portions of said plurality of engagement sections for bringing said input and/or output block into a temporarily mounted state on said main body.

15. The electronic apparatus as set forth in claim 14, wherein the operation mechanism operates said spring to shift said plurality of engagement sections in said direction for engaging with said plurality of engagable sections when said input and/or output block is temporarily mounted on said main body.

16. The electronic apparatus as set forth in claim 15, wherein said spring includes an urging member for urging said slide member in said direction where said plurality of engagement sections are engaged with said plurality of engagable sections.

17. The electronic apparatus as set forth in claim 16, wherein said input and/or output block is attached to said main body with an operation of said attaching/detaching mechanism for shifting said slide member when said plurality of engagable sections are engaged with the plurality of tip portions of said plurality of engagement sections for engaging said plurality of engagement sections with said plurality of engagable sections.

18. The electronic apparatus as set forth in claim 14, wherein said plurality of engagement sections are provided in a stepped arrangement and said plurality of engagable sections are provided in a corresponding stepped arrangement.

\* \* \* \* \*